United States Patent
Zhang et al.

(10) Patent No.: US 9,532,194 B2
(45) Date of Patent: Dec. 27, 2016

(54) DYNAMIC ADJUSTMENT OF WIRELESS COMMUNICATION TRANSMISSION RATES

(71) Applicant: Cisco Technology, Inc., San Jose, CA (US)

(72) Inventors: Tao Zhang, Fort Lee, NJ (US); Helder Antunes, Morgan Hill, CA (US); Chintan Patel, Kirkland, WA (US); Mahbubul Alam, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/273,948

(22) Filed: May 9, 2014

(65) Prior Publication Data

US 2015/0327028 A1  Nov. 12, 2015

(51) Int. Cl.
| | |
|---|---|
| *H04W 72/00* | (2009.01) |
| *H04W 4/12* | (2009.01) |
| *H04W 64/00* | (2009.01) |
| *H04L 29/08* | (2006.01) |
| *H04W 28/26* | (2009.01) |
| *G08G 1/16* | (2006.01) |

(52) U.S. Cl.
CPC ............ *H04W 4/12* (2013.01); *G08G 1/163* (2013.01); *H04L 67/12* (2013.01); *H04W 28/26* (2013.01); *H04W 64/006* (2013.01)

(58) Field of Classification Search
CPC ...... H04W 4/12; H04W 28/26; H04W 64/006; H04L 67/12
USPC ...................................... 455/452.1
See application file for complete search history.

(56) References Cited

U.S. PATENT DOCUMENTS

| | | | |
|---|---|---|---|
| 6,604,416 B2* | 8/2003 | Tsujita | .................. 73/146.5 |
| 6,985,089 B2 | 1/2006 | Liu et al. | |
| 8,452,969 B2 | 5/2013 | Iyer et al. | |
| 8,510,324 B2 | 8/2013 | Bai et al. | |

(Continued)

FOREIGN PATENT DOCUMENTS

| | | |
|---|---|---|
| JP | 2001061185 A | 3/2001 |
| WO | 1630765 A1 | 3/2006 |

(Continued)

OTHER PUBLICATIONS

Xu et al., "Vehicle-Vehicle Safety Messaging in DSRC".

(Continued)

*Primary Examiner* — Amancio Gonzalez
(74) *Attorney, Agent, or Firm* — Patterson + Sheridan, LLP

(57) ABSTRACT

Apparatus, methods and logic for vehicles to determine vehicle to vehicle (V2V) safety message transmission rates for transmitting V2V safety messages based on how frequently the vehicles actually need to exchange safety messages, including factors such as vehicle velocities, distances among vehicles, and on how quickly the inter-vehicle distances are closing up. The determined V2V safety message transmission rates are selectively dynamically adjusted in accordance with detected significant changes in one or more of the inter-vehicle distances or inter-vehicle speeds. To avoid needless frequent changes to the transmission rate, statistical modeling techniques including hypothesis testing and sequential change detection are selectively used to more accurately detect significant changes in inter-vehicle distances or inter-vehicle speeds that warrant a change to the message transmission rate.

18 Claims, 6 Drawing Sheets

(56) References Cited

U.S. PATENT DOCUMENTS

| | | |
|---|---|---|
| 8,514,825 B1 | 8/2013 | Addepalli et al. |
| 8,520,695 B1 | 8/2013 | Rubin et al. |
| 8,559,537 B2 | 10/2013 | Fernandez et al. |
| 9,084,190 B2 * | 7/2015 | Noh et al. |
| 2010/0198459 A1 * | 8/2010 | Kosai ............... H04W 52/267 |
| | | 701/36 |
| 2011/0128902 A1 | 6/2011 | Guo |
| 2013/0279695 A1 * | 10/2013 | Rubin et al. ............... 380/255 |

FOREIGN PATENT DOCUMENTS

| | | |
|---|---|---|
| WO | 2013112565 A1 | 8/2013 |
| WO | 2014046575 A1 | 3/2014 |

OTHER PUBLICATIONS

Greg R. Notess, "New Databases from the Internet Search Services", Journal Database, vol. 20, Issue 2, Apr. 1997, pp. 72-74.
Bansal et al., "EMBARC: error model based adaptive rate control for vehicle-to-vehicle communications", Proceeding of the 10th ACM International Workshop on Vehicular inter-networking systems, and applications, 2013, pp. 41-50.
European Patent Office, International Application No. PCT/US2015/029704, International Search Report dated Sep. 28, 2015, 4 pages.

* cited by examiner

DYNAMIC ADJUSTMENT OF WIRELESS COMMUNICATION TRANSMISSION RATES

TECHNICAL FIELD

The present disclosure relates generally to wireless communications and, more particularly, to control of the transmission rate of messages between vehicles. However, it will be appreciated that the embodiments herein will find use with any portable or mobile communication device in many applications.

BACKGROUND

Vehicle-to-vehicle (V2V) communications enable a wide range of vehicle control, safety, and other applications. To help reduce traffic accidents, vehicles may use V2V communications to exchange safety messages with nearby vehicles wherein the safety messages may contain data relating to the position, speed, driving direction, and other useful information transmitted from each vehicle. The information in the safety messages exchanged between vehicles may be used to assess risks of collision with other vehicles, to warn drivers of danger or to take proactive actions to control the vehicle for avoiding the danger accordingly.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Overview

Figure 1:
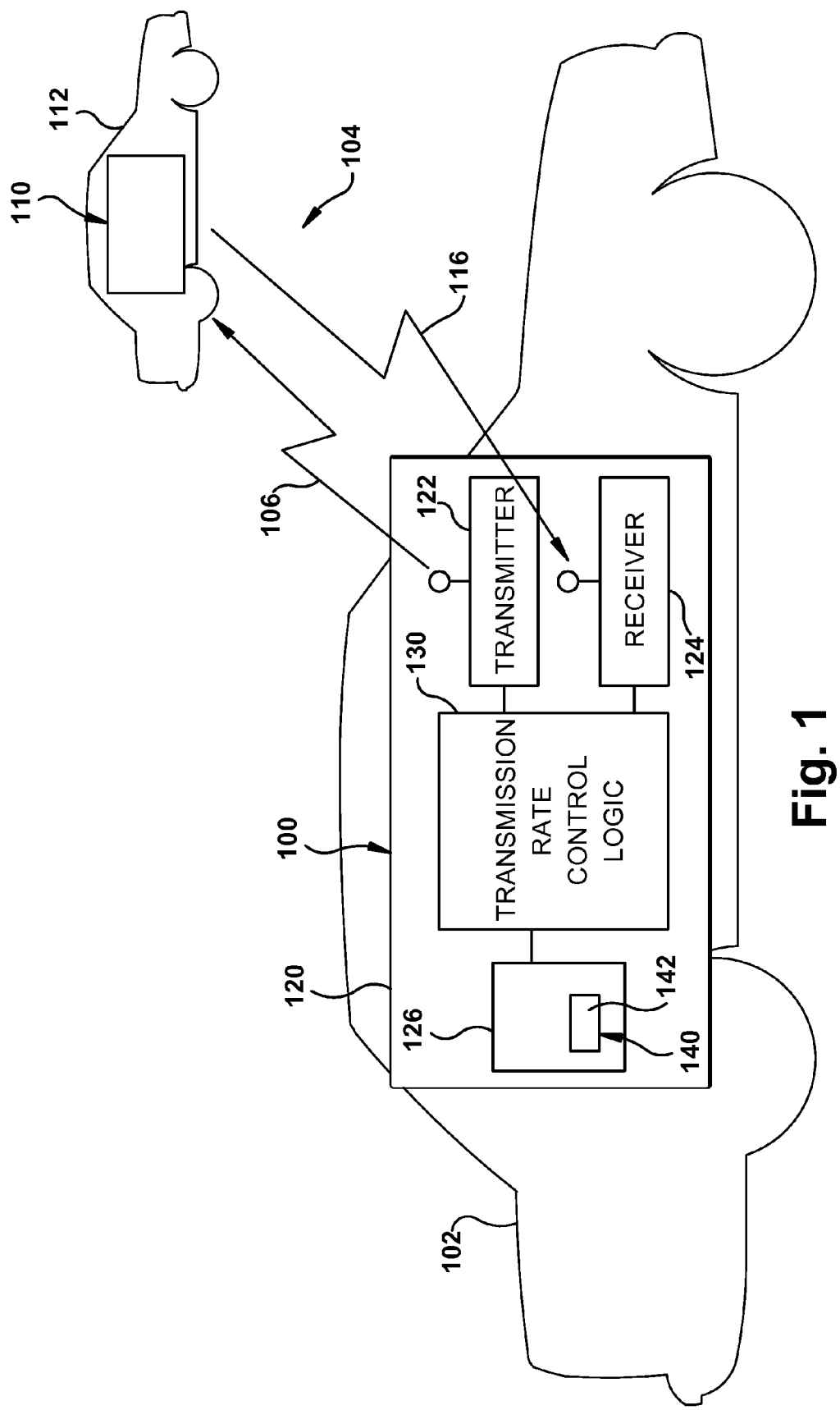
FIG. 1 is a simplified block diagram illustrating a system for selectively dynamically adjusting the transmission rates of V2V messages in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with example embodiments herein, apparatus, methods and logic encoded in one or more tangible non-transient computer readable media for execution by a processor and when executed by the processor, the logic, the apparatus, and the methods are operable to determine a desired communication transmission rate for transmitting V2V safety messages from a vehicle. The transmission rate is determined in accordance with a practical need by the transmitting vehicle as well as a need by the nearby vehicles for data contained in the messages based on vehicle and inter-vehicle conditions. It is preferred that all vehicles in an area of interest determine their respective desired V2V safety message transmission rate. In an example embodiment, the V2V message transmission rate is determined between a minimum frequency high enough to enable the transmitting vehicle and any other nearby vehicles to react to data within the messages during the time periods between two consecutive V2V messages to thereby help to avoid collisions, and a transmission frequency as low as possible above the minimum frequency to help minimize unnecessary radio channel load and congestion between the vehicles.

In accordance with further example embodiments herein, apparatus, methods and logic encoded in one or more tangible non-transient computer readable media for execution by a processor and when executed by the processor, the logic, the apparatus, and the methods are operable to transmit V2V safety messages from a vehicle at a desired communication rate. The V2V messages are transmitted at a desired rate that is determined in accordance with a practical need by the transmitting vehicle as well as the need by the nearby vehicles for data contained in the messages based on vehicle and inter-vehicle conditions. It is preferred that all vehicles in an area of interest transmit their respective V2V safety messages at their respective determined desired rate. In an example embodiment, the V2V messages are transmitted at a transmission rate that is determined between a minimum frequency selected high enough to enable the transmitting vehicle and any other nearby vehicles to react to data within the messages during the time periods between two consecutive V2V messages to thereby help to avoid collisions, and at a transmission frequency as low as possible above the minimum frequency to help minimize unnecessary radio channel load and congestion between the vehicles.

In accordance with still further example embodiments herein, apparatus, methods and logic encoded in one or more tangible non-transient computer readable media for execution by a processor and when executed by the processor, the logic, the apparatus, and the methods are operable to dynamically adjust the selected desired transmission rate of V2V messages from a vehicle based on one or more vehicle and/or inter-vehicle conditions. In the example embodiment, the selected transmission rate is dynamically adjusted to an adjusted effected minimum transmission rate between a frequency high enough so that the vehicle will not likely collide with any other nearby vehicle during the time periods between two consecutive V2V safety messages, and a transmission frequency as low as possible above the minimum frequency to help minimize unnecessary radio channel load and congestion between the vehicles.

In accordance with still further example embodiments herein, apparatus, methods and logic encoded in one or more tangible non-transient computer readable media for execution by a processor and when executed by the processor, the logic, the apparatus, and the methods are operable to selectively dynamically adjust the selected desired transmission rate of V2V messages from a vehicle based on one or more vehicle and/or inter-vehicle conditions. In the embodiments, to avoid needless frequent changes to the transmission rate, additional techniques and processing are used to more accurately detect significant changes in inter-vehicle distances D(t) and in inter-vehicle speeds R(t) that warrant a change to the message transmission rate. Statistical modeling techniques are applied in an example embodiment including for example various one or more of hypothesis testing techniques, sequential change detection techniques, and others as may be necessary or desired to help to avoid needless frequent changes to the transmission rate.

DETAILED DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

To be effective, vehicles need to receive the V2V safety messages from each other at message rate frequencies high enough so that they will not likely collide with each other during the time periods between two consecutive V2V safety messages received from each other respective vehicle. On the other hand, the transmission rate of V2V safety messages should be reduced to a rate as low as possible to help minimize unnecessary radio channel load and congestion. Neither fixed transmission rate schemes nor protocols for dynamically adjusting the transmission rate based on radio channel load and congestion level parameters alone are fully effective in achieving optimal results.

With reference now to the drawings, wherein the showings are for purposes of illustrating example embodiments only and not for purposes of limiting same, FIG. 1 illustrates a system 100 for use with an associated first vehicle 102 for communicating wireless signals 104 containing messages such as V2V safety messages for example with one or more similarly configured corresponding systems 110 in one or more associated second vehicles 112. In an embodiment, a nominal V2V safety message transmission rate may be ten to sixty (10-60) message transmissions per second, or the like. In an embodiment, the system 100 determines a desired communication transmission rate for transmitting signals 104 containing the V2V messages wherein the determined message transmission rate may be different than the nominal message transmission rate, though not necessarily. In a further embodiment, the system transmits the signals 104 containing the V2V messages at the determined transmission rate. Further, the system 100 selectively dynamically adjusts the transmission rate of signals 106 containing V2V safety messages being sent in accordance with an example embodiment. Further in accordance with an example embodiment, the system 100 controls the rate of dynamic adjustments made to the transmission rate of signals 106 containing V2V safety messages being sent.

As shown, the system 100 includes an apparatus 120 comprising a wireless transmitter 122, a wireless receiver 124, a non-transient physical memory 126, and transmission rate control logic 130 operatively coupled with the memory 126, the wireless transmitter 122, and the wireless receiver 124. "Logic" and/or "module" as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSoC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Figure 2A:
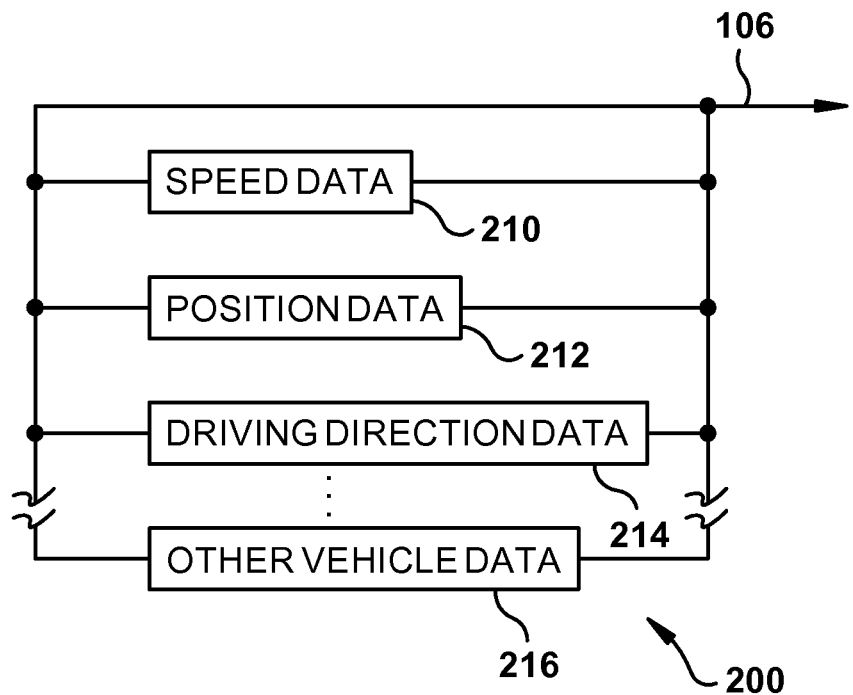
FIG. 2a is a simplified block diagram illustrating data and data fields of a V2V safety message contained in a signal transmitted from the system of FIG. 1 in accordance with an example embodiment.

The system 100 shown in the Figure is configured in accordance with an example embodiment to communicate signals 104 containing V2V messages with one or more associated vehicles 112. In this regard, signals 116 containing V2V safety messages being sent by the one or more similarly configured corresponding systems 110 of the one or more associated second vehicles 112 are received by the receiver 124. Also in the example embodiment illustrated, the wireless transmitter 122 of the apparatus 102 is configured to transmit a first signal 106 comprising data representative of a message; preferably a V2V safety message to the one or more associated second vehicles 112. As shown in diagrammatic form in FIG. 2a, the V2V safety message 200 contained in the first signal 106 includes data comprising one or more of speed data 210 representative of a current speed of the associated vehicle 102, position data 212 representative of a current position of the associated first vehicle 102, driving direction data 214 representative of a current driving direction of the associated first vehicle 102, and other vehicle secondary data 216 representative of other secondary information relating to the associated first vehicle 102 such as for example an acceleration parameter of the associated first vehicle 102, passenger occupancy and/or load information of the associated first vehicle 102, or any other useful data as may be necessary or desired for use by the apparatus 102. In accordance with the example embodiment, the position data 212 representative of the current position of the associated first vehicle 102, and the driving direction data 214 representative of the current driving direction of the associated first vehicle 102 may be relative to a predetermined location or any other standardized, non-standard or specialized location or frame of reference.

Figure 2B:
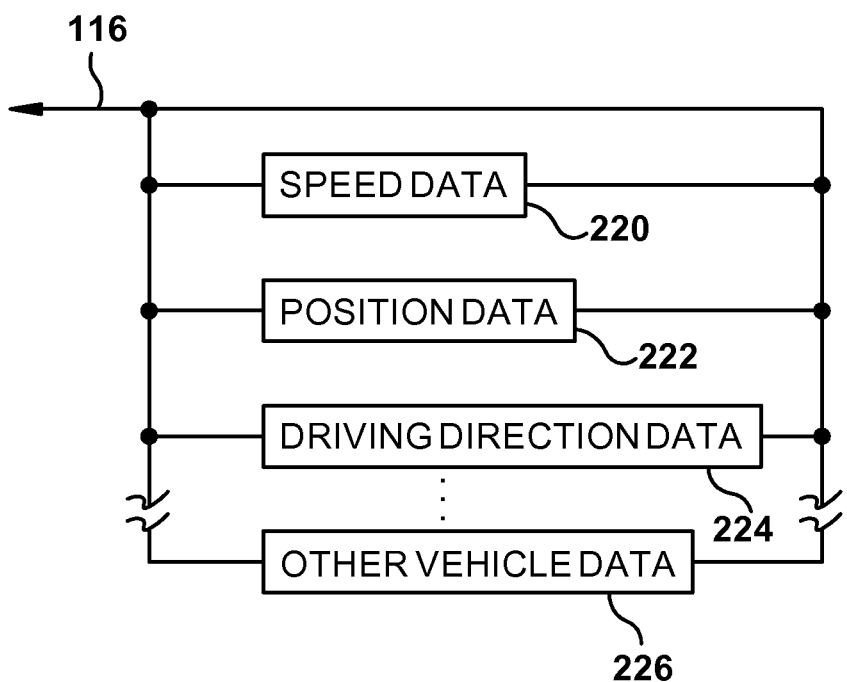
FIG. 2b is a simplified block diagram illustrating data and data fields of a V2V safety message contained in a signal received by the system of FIG. 1 in accordance with an example embodiment.

Further in the example embodiment illustrated, the wireless receiver 124 of the apparatus 102 is configured to receive a second signal 116 comprising data representative of a message, preferably a V2V safety message from one or more of the associated second vehicles 112. As shown in diagrammatic form in FIG. 2b, the V2V safety message 200 contained in the second signal 116 includes data comprising one or more of speed data 220 representative of a current speed of the associated second vehicle 112, position data 222 representative of a current position of the associated second vehicle 102, driving direction data 224 representative of a current driving direction of the associated second vehicle 112. The signal also contains other vehicle secondary data 226 representative of other secondary information relating to the associated second vehicle 112 such as for example an acceleration parameter of the associated second vehicle 112, passenger occupancy and/or load information of the associated second vehicle 112, or any other useful data as may be necessary or desired for communicating in the second signal 116. In accordance with the example embodiment, the position data 222 representative of the current position of the associated second vehicle 102, and the driving direction data 224 representative of the current driving direction of the associated second vehicle 112 may be relative to a predetermined location or any other standardized, non-standard or specialized location or frame of reference.

Still further in the example embodiment illustrated, the non-transient memory 126 stores first operational data 140 in a database 142 or other electronic file storage of the memory 126. The first operational data 140 is representative of one or more of a current speed of the associated first vehicle 102, a current position of the associated first vehicle 102, and a current first driving direction of the associated first vehicle 102. In accordance with the example embodiment, the first operational data 140 is representative of the current position of the associated first vehicle 102, and the current first driving direction of the associated first vehicle 102 may be relative to a predetermined location or any other standardized, non-standard or specialized location or frame of reference. In one embodiment, the transmission rate control logic 130 of the example embodiment includes logic configured to determine the current speed, the current first position, and the current first driving direction of the associated first vehicle 102 using various data contained in one or more signals (not shown) received from the first vehicle 102. The determined speed, position, and driving direction information is stored by the logic 130 in the memory 126. In another embodiment, the information relating to the current speed, position, and driving direction is delivered to the transmission rate control logic 130 by one or more suitable components (not shown) of the vehicle 102, and then stored by the logic 130 in the memory 126.

In the example embodiment, the transmission rate control logic 130 determines a first message transmission rate for transmitting the first signal 106 by the wireless transmitter 122 in accordance with a processing of the first operational data 140 and the one or more of the speed data 220 representative of the speed of the associated second vehicle 112, the position data 222 representative of the position of the associated second vehicle 112, and the driving direction data 224 representative of the driving direction of the associated second vehicle 112. Thereafter, the wireless transmitter 122 selectively transmits the first signal 106 at the first message transmission rate determined by the transmission rate control logic.

In accordance with the example embodiments herein, overall, the transmission rate of V2V safety messages are determined based on an actual need for the messages to be exchanged, rather than being based exclusively on channel load and/or traffic, on a fixed transmission rate to accommodate worst case scenarios, or on other considerations not directly related to an actual need for the messages to be exchanged. Further, the determined transmission rate of V2V safety messages is selectively dynamically adjusted, preferably though not necessarily, in real time based on factors that directly impact how frequently the vehicles actually need to exchange safety messages, including factors such as vehicle speed, relative vehicle velocities, distances among vehicles, and on how quickly the distances are spreading or closing up. However, vehicle velocities and the distances between vehicles can vary widely while the vehicles can still use the same message transmission rate to meet their safety application requirements. As will be described in greater detail below with regard to statistical modeling technique embodiments, to avoid needless frequent changes to the determined transmission rate affected and to thereby minimize processing overhead associated with the needless frequent changes to the determined transmission rate, additional methods are used to more accurately detect significant changes in inter-vehicle relative distances D(t) and the relative speed between vehicles R(t) that warrant a change to the message transmission rate.

Figure 3A:
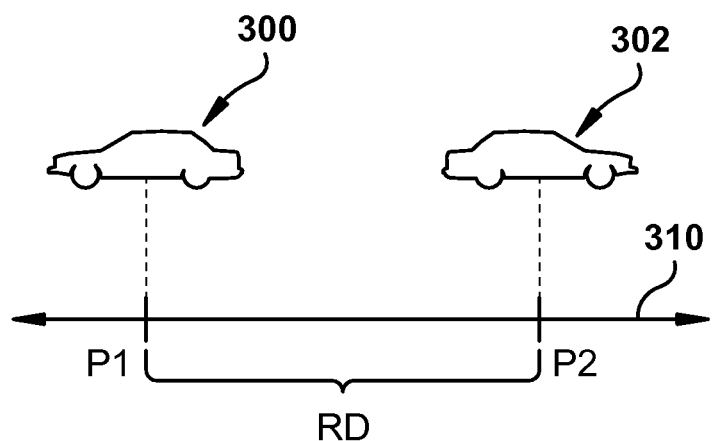
FIG. 3a is a simplified diagram illustrating associated vehicles moving in a common direction along a path and using the system shown in FIG. 1.
Figure 3B:
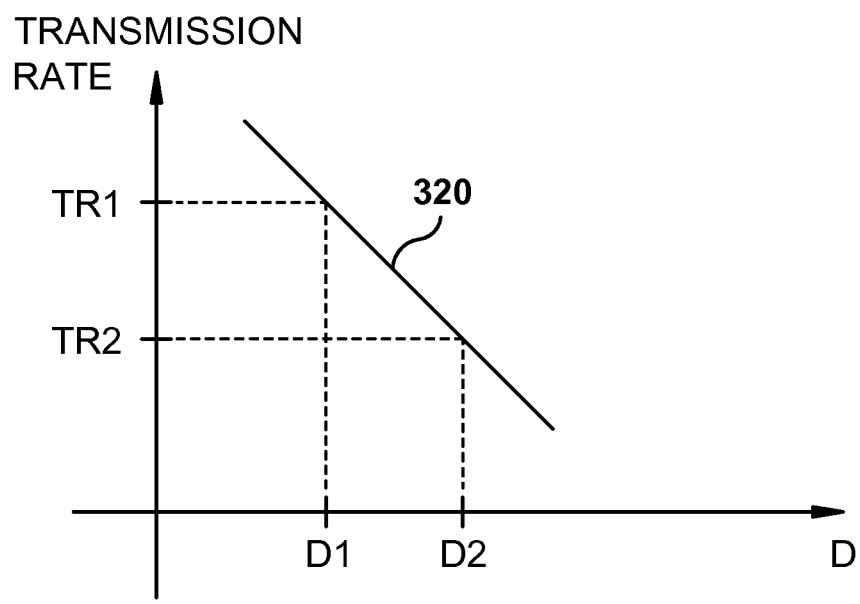
FIG. 3b is a simplified graph illustrating a V2V message transmission rate versus vehicle relative distance curve in accordance with an example embodiment.

FIG. 3a is a simple diagram showing a first vehicle 300 disposed at a location P1 and a second vehicle 302 disposed at a location P2, wherein the relative distance RD between the first and second vehicles 300, 302 may be increased or decreased as the vehicles travel along a path 310 or the like. FIG. 3b is a simplified graph illustrating an example V2V message transmission rate versus vehicle relative distance curve. In accordance with an embodiment, the apparatus 102 recognizes that when two vehicles such as the first and second vehicles 300, 302 for example are far away from each other, they can receive safety messages from each other at a lower frequency than when they are closer to each other without adversely affecting safety conditions. As shown in general in FIG. 3b, the transmission rate 320 of the signals 106 transmitted by the transmitter 122 as determined by the transmission rate control logic 130 is reduced in accordance with an embodiment from a first transmission rate TR1 when the inter-vehicle separation RD between the first and second vehicles 300, 302 is increased from a first relative distance D1 to a second relative distance D2. Correspondingly, in accordance with the embodiments herein, the transmission rate 320 of the signals 106 transmitted by the transmitter 122 as determined by the transmission rate control logic 130 is increased from the second transmission rate TR2 when the inter-vehicle separation RD between the first and second vehicles 300, 302 is reduced from the second relative distance D2 to the first relative distance D1. Although the transmission rate 320 of the signals 106 transmitted by the transmitter 122 is shown as being linear, the embodiments herein are not limited to only linear changes in the transmission rate wherein the transmission rate 320 may follow a linear change path, a non-linear change path, or any combination of linear and/or non-linear change paths.

In accordance with an embodiment, the apparatus 102 recognizes that when two vehicles such as the first and second vehicles 300, 302 for example are far away from each other, they can transmit and receive safety messages between each other at a lower frequency or message transmission rate than when they are closer to each other without adversely affecting safety conditions. As shown in general in FIG. 3b, the transmission rate 320 of the signals 106 transmitted by the transmitter 122 as determined by the transmission rate control logic 130 is reduced from a first transmission rate TR1 when the inter-vehicle separation RD between the first and second vehicles 300, 302 is increased from a first relative distance D1 to a second relative distance D2. Correspondingly, in accordance with the embodiments herein, the transmission rate 320 of the signals 106 transmitted by the transmitter 122 as determined by the transmission rate control logic 130 is increased from the second transmission rate TR2 when the inter-vehicle separation D between the first and second vehicles 300, 302 is reduced from the second relative distance D2 to the first relative distance D1. Although the transmission rate 320 of the signals 106 transmitted by the transmitter 122 is shown as being linear, the embodiments herein are not limited to only linear changes in the transmission rate wherein the transmission rate 320 may follow a linear change path, a non-linear change path, or any combination of linear and/or non-linear change paths.

Figure 4A:
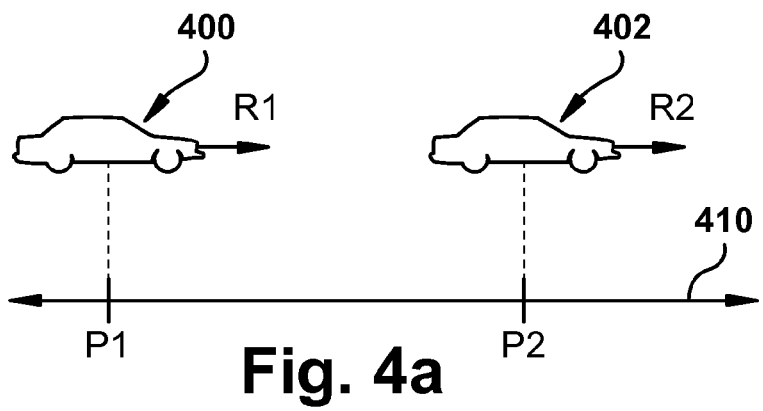
FIG. 4a is a simplified diagram illustrating associated vehicles moving in the same direction but either towards or away from each other along a path and using the system shown in FIG. 1.
Figure 4B:
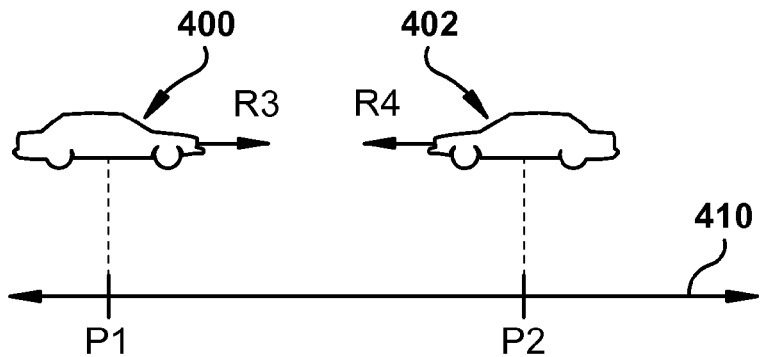
FIG. 4b is a simplified diagram illustrating associated vehicles moving towards each other along a path and using the system shown in FIG. 1.

FIG. 4*a* is a simple diagram showing a first vehicle 400 disposed at a location P1 and moving at a speed or rate R1 along a path 410, and a second vehicle 402 disposed at a location P2 and moving at a speed or rate R2 along the path 410. The relative speed or rate of travel R(t) between the first and second vehicles 400, 402 may be increased or decreased as the vehicles travel along a path 410 or the like. In the illustration, the relative speed or rate of travel R(t) between the first and second vehicles 400, 402 is calculated or otherwise determined by the transmission rate control logic as (R1−R2). In the example situation, the vehicles are generally separating from each other or are becoming physically further apart when R2>R1. However, the vehicles are generally approaching each other or are becoming physically closer together when R1>R2. Similarly and with reference to FIG. 4*b*, the first vehicle 400 is disposed at the location P1 and is moving at a speed or rate R3 along the path 410, and the second vehicle 402 is disposed at the location P2 and is moving at a speed or rate R4 along the path 410. In the Figure, however, the vehicles are moving towards each other for all positive values or R3 or R4. The relative speed or rate of travel R(t) between the first and second vehicles 400, 402 is calculated or otherwise determined by the transmission rate control logic as (R3−R4). The vehicles are generally approaching each other faster for any increase in either R3, R4 or both R3 and R4.

Figure 4C:
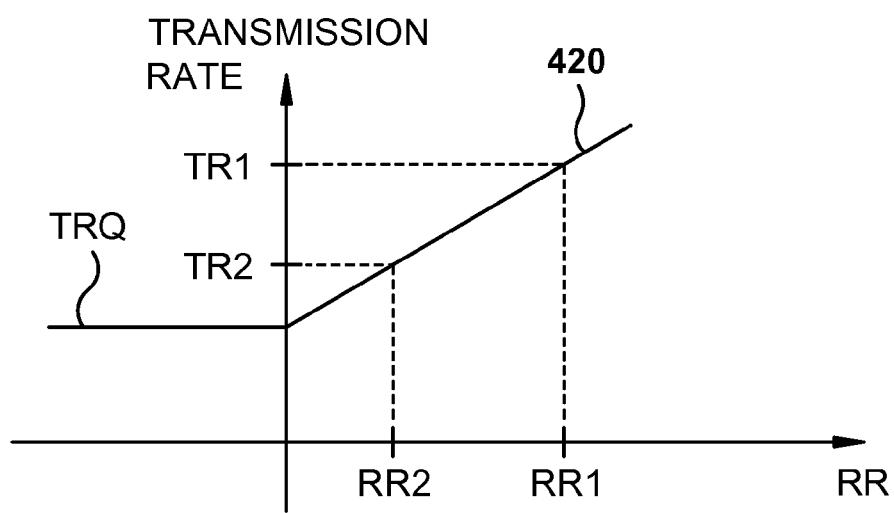
FIG. 4c is a simplified graph illustrating a V2V message transmission rate versus vehicle relative rate or speed curve in accordance with an example embodiment.

In accordance with an embodiment, the apparatus 102 recognizes that when two vehicles are getting closer to each other at a higher speed, they will need to receive safety messages from each other at a higher frequency than when they are moving slower toward each other or when they are moving farther apart from each other. In this regard and as shown in FIG. 4*c*, the transmission rate 420 of the signals 106 transmitted by the transmitter 122 as determined by the transmission rate control logic 130 is reduced from a first transmission rate TR1 when the inter-vehicle relative speed or rate RR between the first and second vehicles 400, 402 is decreased from a first relative speed or rate RR1 to a second relative rate RR2. Correspondingly, in accordance with the embodiments herein, the transmission rate 420 of the signals 106 transmitted by the transmitter 122 as determined by the transmission rate control logic 130 is increased from the second transmission rate TR2 when the inter-vehicle relative speed or rate RR between the first and second vehicles 400, 402 is increased from the second relative rate RR2 to the first relative rate RR1. Although the transmission rate 420 of the signals 106 transmitted by the transmitter 122 is shown as being linear, the embodiments herein are not limited to only linear changes in the transmission rate wherein the transmission rate 420 may follow a linear change path, a non-linear change path, or any combination of linear and/or non-linear change paths. The transmission rate 420 as determined by the transmission rate control logic 130 is set to a minimum rate TRQ when the relative speed or rate between the first and second vehicles is zero (0) or when the vehicles are moving apart.

In accordance with an embodiment, each associated vehicle carries an apparatus 120 in operative communication with a vehicle network wherein each vehicle 102, 112 broadcasts safety messages to nearby vehicles. As described above, each of the safety messages 200, 202 contain information on the sending vehicle's speed, position, and driving direction.

The system 100 of each vehicle 102 uses the contents of the safety messages 202 and the radio signals received from other vehicles 112 to determine the distance D between itself and the closest other vehicle ("minimum inter-vehicle distance") and the relative speed R between itself and the closest vehicle.

Consider a first vehicle v. Let:
D(t) be its minimum inter-vehicle distance with other vehicles at time t;
R(t) be the relative speed between vehicle v and the closest vehicle to it (vehicle u) at time t;
S(R(t)) be the smallest safe distance between any two vehicles at time t given their relative speed R(t) at time t; and
Alpha be the maximal acceleration rate of any vehicle.

After sending a safety message at time t1, it will be safe for vehicle v to send its next safety message at time t2>t1 if the following condition is met:

$$D(t1)-(t2-t1)*R(t1)*2*\text{alpha} > S(R(t1)*2*\text{alpha}*(t2-t1)) \quad (1)$$

This implies that even if all vehicles accelerate to their best abilities starting from time t1, vehicle v's minimum inter-vehicle distance will still be larger than the smallest safe distance after time t2. Therefore, the message transmission interval TI can be set by the system 100 herein to be TI=(t2−t1).

In accordance with the example embodiment herein, a minimum transmission interval T0 is determined by the transmission rate control logic 130 and is set or otherwise stored in the memory 126 so that any one or more safety applications being executed by the transmission rate control logic 130 will not attempt to transmit messages beyond the vehicle's communication capabilities.

A maximum transmission interval T1 is determined by the transmission rate control logic 130 and is set or otherwise stored in the memory 126 so that a vehicle will always transmit safety messages at a minimum frequency. Therefore, TI can be set by the system 100 herein as:

$$TI=\min\{T1, \max\{T0, (t2-t1)\}\} \quad (2)$$

Figure 5:
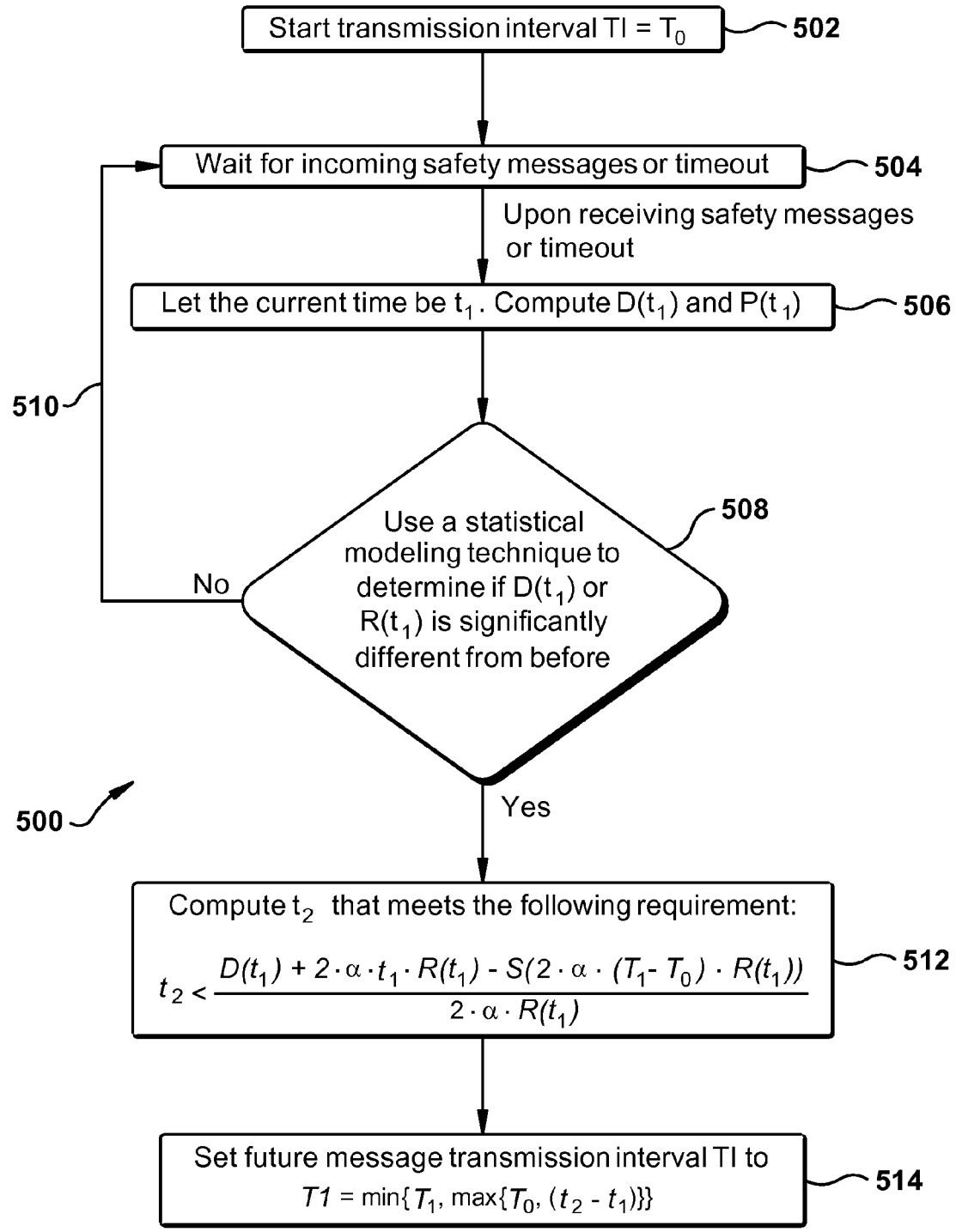
FIG. 5 is a flow chart illustrating a method for determining a V2V message transmission rate.

In view of the foregoing structural and functional features described above, a methodology 500 for the system 100 of the associated vehicle 102 to determine its safety message transmission rate in accordance with example embodiments will be better appreciated with reference to FIG. 5. While, for purposes of simplicity of explanation, the methodology of FIG. 5 is shown and described as executing serially, it is to be understood and appreciated that the example embodiments are not limited by their illustrated orders, as some aspects could occur in different orders and/or concurrently with other aspects from that shown and described herein. Moreover, not all illustrated features may be required to implement a methodology in accordance with an aspect of an example embodiment. The methodologies described herein are suitably adapted to be implemented in hardware, software, or a combination thereof.

The methodology 500 may be implemented by the apparatus 120 (FIG. 1) and/or computer system 110 (FIG. 1) and is shown in a simplistic flow chart in FIG. 5 for ease of describing the example embodiment. With reference now to that Figure, upon vehicle ignition on, at 502, the system 100 of the vehicle sets its initial transmission interval to the minimum interval T0 as determined by the transmission rate control logic 130. In this condition, the wireless signals 106 containing the V2V safety messages will be transmitted by the transmitter 122 at the highest frequency in accordance with the capabilities of the transmitter 122. Upon receiving new safety messages at 504 from systems 110 carried by other vehicles 112, the transmission rate control logic 130 of the associated vehicle 102 uses the information in these messages (e.g., vehicles' positions 212, speeds 210, and directions 214) to calculate at 506 and update the values of the relative distance D(t) and the relative speed/rate R(t) stored in the memory 126. If it is determined at 508 by the transmission rate control logic 130 that the values of D(t) and R(t) do not change significantly, the vehicle will not change 510 its message transmission rate. However, if it is determined at 508 by the transmission rate control logic 130 that a significant change in either the relative distance D(t) or the relative speed/rate R(t) is detected at time t1, the transmission rate control logic 130 of the associated vehicle 102 re-computes at 512 the message transmission rate to be used in the future by computing t2 that meets the condition in Equation (1) and, further, at 514 sets the future message transmission interval according to Equation (2).

It is to be appreciated that it is difficult to solve Equation (1) for s2 because s2 is also an input to the function S(*). Therefore, in accordance with the example embodiment, the transmission rate control logic 130 obtains conservative estimates and makes it practical to solve Equation (1) for s2, by substituting (t2−t1) in the right hand side of Equation (1) with the worst-case value (T1−T2), which is a constant and independent of s2. In this way, the transmission rate control logic 130 of the apparatus 120 of the embodiment easily determines S(R(t)) the smallest safe distance between any two vehicles at time t given their relative speed R(t) at time t.

It is to be further appreciated that vehicle velocities and the distances between vehicles can vary widely while the vehicles can still use the same message transmission rate to meet their safety application requirements. To avoid needless frequent changes to the transmission rate, in accordance with further embodiments herein, the transmission control logic 130 uses additional methods and techniques to more accurately detect significant changes in the relative distance D(t) between vehicles and the relative speed/rate between vehicles R(t) that warrant a change to the message transmission rate.

In accordance with the embodiments herein, statistical modeling techniques are used by the transmission control logic 130 to more accurately detect significant changes in the relative distance D(t) between vehicles and the relative speed/rate between vehicles R(t) that warrant a change to the message transmission rate. In this regard, the transmission control logic 130 uses in an embodiment a hypothesis testing technique to detect significant changes in the relative distance D(t) between vehicles and the relative speed/rate between vehicles R(t) that warrant a change to the message transmission rate. Using the hypothesis testing, the apparatus 120 of the associated vehicle 102 uses past sample values of D(t) and R(t) to derive the parameters of a normal distributions of D(t) and R(t). The transmission rate control logic 130 then uses a set of new sample values of D(t) to test whether the new samples represent a significant change in the mean of D(t). The transmission control logic 130 performs a similar detection for R(t). Preferably, the set of new samples are typically large enough to produce a reasonably accurate estimate of the mean of the new samples.

In accordance with additional embodiments herein, further statistical modeling techniques are used by the transmission control logic 130 to more accurately detect significant changes in the relative distance D(t) between vehicles and the relative speed/rate between vehicles R(t) that warrant a change to the message transmission rate. In this regard, the transmission control logic 130 uses in an embodiment a sequential change detection technique to detect significant changes in the relative distance D(t) between vehicles and the relative speed/rate between vehicles R(t) that warrant a change to the message transmission rate. In this embodiment, the sequential change detection techniques used by the transmission control logic 130 uses various time series analysis techniques and other more advanced statistical modeling techniques, which typically require smaller numbers of new samples than required by hypothesis testing techniques to test whether a change in the mean of a random variable has occurred. This leads to the advantageous result of a lower detection latency and is therefore very useful for detecting significant changes in D(t) or R(t).

In the embodiment described above, it is assumed that the system 100 of an associated vehicle 102 monitors the closest nearby associated vehicle 112 to determine its safe distance from all the nearby vehicles. However, in accordance with a further example embodiment, a vehicle v may have a closest nearby vehicle u and a second closet nearby vehicle w. Vehicle w could be traveling at significantly faster speed than vehicle u. In such a case, the safe distance computed by the transmission rate control logic 130 based on the position of vehicle u and speed of vehicle u may not actually be safe. Therefore, rather than considering a single closest nearby vehicle, the transmission rate control logic 130 uses a value of R(t) to be the smallest distance between a vehicle v and all its one-hop neighbor vehicles. In this embodiment, two vehicles v and u are one-hop neighbors if they are within a certain distance of each other and there are no other vehicles located between them. The distance threshold for determining one-hop neighbors can be, for example, beta times the minimum safe distance between any two vehicles, where beta can be any positive number greater than 1.

In addition to the above, it is to be appreciated that in some scenarios and situations the distances between a vehicle and its neighboring vehicles can go through cycles of rapid reductions followed immediately by rapid increases. This may happen, for example, when a slow moving vehicle is being passed by other vehicles that travel at much higher speeds. To avoid the need to adjust message transmission rate too frequently in such scenarios, in accordance with yet a further embodiment, the apparatus 120 of the associated vehicle 102 is configured to monitor the rate of change in its distance with its neighboring vehicles and if the rate of change exceeds a given threshold, the transmission rate control logic 130 onboard the vehicle will set its message transmission rate to the maximum transmission rate and will keep using the maximum transmission rate until the rate of change in the distance to neighboring vehicles drops below a certain threshold and stays below the threshold for a given time.

Figure 6:
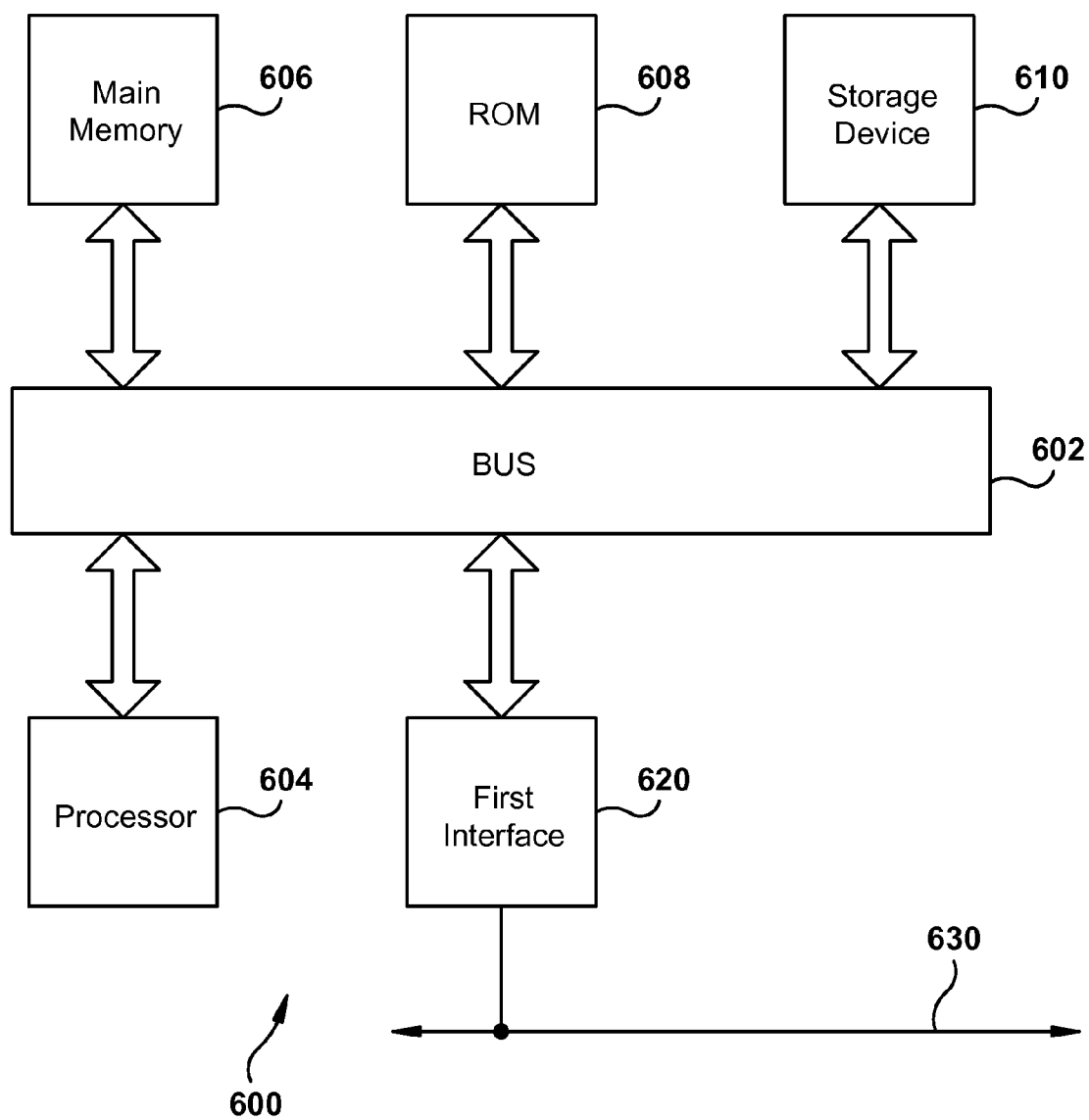
FIG. 6 is a block diagram illustrating an example of a computer system 600 upon which an example embodiment can be implemented

FIG. 6 is a block diagram illustrating an example of a computer system 600 upon which an example embodiment can be implemented. Computer system 600 may be employed to implement the functionality of the transmission rate control logic 130 in the apparatus 120 and/or the system 100 in general, as well as the system 110 of the one or more associated vehicles 112.

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 304. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, and/or flash storage, is provided and coupled to bus 602 for storing information and instructions.

An aspect of the example embodiment is related to the use of computer system 600 for determining the transmission rate of signals containing data representative of V2V safety messages based on one or more of a relative distance between vehicles and a relative speed/rate between the vehicles. A further aspect of the example embodiment is related to the use of computer system 600 for implementing the determined rate to transmit the signals containing data representative of V2V safety messages in accordance with the determined rate. A further aspect of the example embodiment is related to the use of computer system 600 for accurately detecting significant changes in inter-vehicle position and rate that warrant a change to the message transmission rate to help to avoid needless frequent changes to the transmission rate. According to an example embodiment, these functionalities are provided by computer system 600 in response to the processor 604 executing one or more sequences of one or more instructions contained in a non-transitory main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-transitory medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a communication interface 618 comprising a first communication interfaces 620 operatively coupled with the bus 602. Communication interface 618 provides a two-way data communication coupling computer system 600 to a communication link 630. For example, communication interface 618 may be a local area network (LAN) card to provide a data communication connection to a compatible LAN such as for example a Controller Area Network (CAN) network. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus comprising:
    a wireless transmitter configured to transmit a first signal comprising a safety message related to an associated first vehicle;
    a non-transient memory storing first operational data describing motion of the first vehicle, wherein the first operational data comprises one or more of a first speed of the first vehicle, a first position of the first vehicle, and a first driving direction of the first vehicle;
    a wireless receiver configured to receive a second signal from an associated second vehicle, wherein the second signal comprises second operational data describing motion of the second vehicle, wherein the second operational data comprises one or more of first speed data representative of a second speed of the second vehicle, first position data representative of a second position of the second vehicle, and first driving direction data representative of a second driving direction of the second vehicle; and
    transmission rate control logic operatively coupled with the memory, the wireless transmitter, and the wireless receiver, the transmission rate control logic configured to determine, based on the first and second operational data, a first message transmission rate for transmitting the first signal by the wireless transmitter.

2. The apparatus according to claim 1, wherein:
the wireless transmitter transmits the first signal at the first message transmission rate determined by the transmission rate control logic.

3. The apparatus according to claim 2, wherein:
the wireless receiver is further configured to receive a third signal from the second vehicle, the third signal comprising third operational data describing motion of the second vehicle, the third operational data comprising one or more of second speed data representative of a third speed of the second vehicle, second position data representative of a third position of the second vehicle, and second driving direction data representative of a third driving direction of the second vehicle;
the non-transient memory stores fourth operational data comprising one or more of a fourth speed of the first vehicle, a fourth position of the first vehicle, and a fourth driving direction of the first vehicle;
the transmission rate control logic is further configured to dynamically adjust the first message transmission rate to a second message transmission rate determined based on the third and fourth operational data; and
the wireless transmitter transmits a subsequent signal comprising a subsequent safety message at the second message transmission rate determined by the transmission rate control logic.

4. The apparatus according to claim 2, wherein the transmission rate control logic is further configured to:
determine a first relative distance between the first vehicle and the second vehicle based on a comparison between the first operational data and the second operational data;
determine a first relative speed between the first vehicle and the second vehicle based on a comparison between the first operational data and the second operational data; and
determine the first message transmission rate based on a statistical processing of the first operational data and at least one of the determined first relative distance and the determined first relative speed.

5. The apparatus according to claim 4, wherein:
the wireless receiver is further configured to receive a third signal from the second vehicle, the third signal comprising third operational data describing motion of the second vehicle, the third operational data comprising one or more of second speed data representative of a third speed of the second vehicle, second position data representative of a third position of the second vehicle, and second driving direction data representative of a third driving direction of the second vehicle;
the non-transient memory stores fourth operational data comprising one or more of a fourth speed of the first vehicle, a fourth position of the first vehicle, and a fourth driving direction of the first vehicle;
the transmission rate control logic is further configured to:
determine a second relative distance between the first vehicle and the second vehicle based on a comparison between the third and fourth operational data;
a second relative speed between the first vehicle and the second vehicle based on a comparison between the third and fourth operational data; and
determine the second message transmission rate based on a statistical processing of the second operational data and at least one of the determined second relative distance and the determined second relative speed; and
the wireless transmitter transmits a subsequent signal comprising a subsequent safety message at the determined second message transmission rate.

6. The apparatus according to claim 5, wherein the transmission rate control logic is further configured to:
determine a first change in relative distance between the first vehicle and the second vehicle based on a comparison between the determined first and second relative distances;
determine a first change in relative speed between the first vehicle and the second vehicle based on a comparison between the determined first and second relative speeds; and
determine the second message transmission rate based on a statistical processing of the determined first change in relative distance and the determined first change in relative speed.

7. The apparatus according to claim 6, wherein the statistical processing of the determined first change in relative distance and the determined first change in relative speed comprises one or more of a hypothesis testing processing or a sequential change detection processing.

8. A method comprising:
storing first operational data in a non-transient memory, the first operational data describing motion of the first vehicle and comprising one or more of a first speed of the first vehicle, a first position of the first vehicle, and a first driving direction of the first vehicle;
receiving, from a second vehicle and using a wireless receiver, a third signal comprising second operational data, the second operational data describing motion of the second vehicle and comprising one or more of first speed data representative of a second speed of the second vehicle, first position data representative of a second position of the second vehicle, and first driving direction data representative of a second driving direction of the second vehicle;
determining a first message transmission rate for transmitting a first vehicle-to-vehicle (V2V) safety message from the first vehicle to the second vehicle based on the first operational data and the second operational data, wherein the first message transmission rate is determined using transmission rate control logic operatively coupled with the memory, a wireless transmitter, and the wireless receiver, the first message transmission rate determined based on the first operational data and the second operational data;
transmitting, using the wireless transmitter, a first signal comprising the first V2V safety message from the first vehicle at the first message transmission rate;
determining a second message transmission rate for transmitting a second V2V safety message from the first vehicle to the second vehicle based on a statistical processing of a change in the first operational data during a first time period and a change in the second operational data during the first time period; and
transmitting, using the wireless transmitter, a second signal comprising the second V2V safety message from the first vehicle at the second message transmission rate.

9. The method according to claim 8, further comprising:
receiving, from the second vehicle and using the wireless receiver, a fourth signal comprising third operational data describing motion of the second vehicle, wherein the third operational data comprises one or more of second speed data representative of a third speed of the second vehicle, second position data representative of a third position of the second vehicle, and second driving direction data representative of a third driving direction of the second vehicle;

storing fourth operational data describing motion of the first vehicle in the non-transient memory, the fourth operational data comprising one or more of a fourth speed of the first vehicle, a fourth position of the first vehicle, and a fourth driving direction of the first vehicle; and dynamically adjusting, using the transmission rate control logic, the first message transmission rate to the second message transmission rate determined based on the third and fourth operational data.

10. The method according to claim 8, further comprising:

determining, using the transmission rate control logic, a first relative distance between the first vehicle and the second vehicle based on a comparison between the first operational data and the second operational data;

determining, using the transmission rate control logic, a first relative speed between the first vehicle and the second vehicle based on a comparison between the first operational data and the second operational data; and wherein the first message transmission rate is determined based on a statistical processing of the first operational data and at least one of the determined first relative distance and the determined first relative speed.

11. The method according to claim 10, further comprising:

receiving, from the second vehicle and using the wireless receiver, a fourth signal comprising third operational data describing motion of the second vehicle, wherein the third operational data comprises one or more of second speed data representative of a third speed of the second vehicle, second position data representative of a third position of the second vehicle, and second driving direction data representative of a third driving direction of the second vehicle;

storing fourth operational data describing motion of the first vehicle in the non-transient memory, the fourth operational data comprising one or more of a fourth speed of the first vehicle, a fourth position of the first vehicle, and a fourth driving direction of the first vehicle;

determining, using the transmission rate control logic, a second relative distance between the first vehicle and the second vehicle based on a comparison between the third and fourth operational data; and determining, using the transmission rate control logic, a second relative speed between the first vehicle and the second vehicle based on a comparison between the third and fourth operational data, wherein the second message transmission rate is determined based on a statistical processing of the second operational data and at least one of the determined second relative distance and the determined second relative speed.

12. The method according to claim 11, further comprising:

determining, using the transmission rate control logic, a first change in relative distance between the first vehicle and the second vehicle based on a comparison between the determined first and second relative distances; and determining, using by the transmission rate control logic, a first change in relative speed between the first vehicle and the second vehicle based on a comparison between the determined first and second relative speeds, wherein the second message transmission rate is determined based on a statistical processing of the determined first change in relative distance and the determined first change in relative speed.

13. The method according to claim 12, wherein the statistical processing of the determined first change in relative distance and the determined first change in relative speed comprises one or more of a hypothesis testing processing or a sequential change detection processing.

14. Logic encoded in one or more tangible non-transient computer readable media for execution by an associated processor and when executed by the associated processor the logic being operable to:

transmit, using a wireless transmitter coupled with the logic, a first signal comprising a safety message related to a first vehicle;

store, in a non-transient memory coupled with the logic, first operational data describing motion of the first vehicle, the first operational data comprising one or more of a first speed, a first position, and a first driving direction of the first vehicle;

receive, from a second vehicle and using a wireless receiver coupled with the logic, a second signal comprising second operational data describing motion of the second vehicle, wherein the second operational data comprises one or more of first speed data representative of a second speed of the second vehicle, first position data representative of a second position of the second vehicle, and first driving direction data representative of a second driving direction of the second vehicle;

determine a first message transmission rate for transmitting the first signal based on the first operational data and the second operational data;

transmit, using the wireless transmitter, the first signal at the determined first message transmission rate;

receive, from the second vehicle and using the wireless receiver, a third signal comprising third operational data describing motion of the second vehicle, wherein the third operational data comprises one or more of second speed data representative of a third speed of the second vehicle, second position data representative of a third position of the second vehicle, and second driving direction data representative of a third driving direction of the second vehicle;

store, in the non-transient memory, fourth operational data describing motion of the first vehicle, the fourth operational data comprising one or more of a fourth speed, a fourth position, and a fourth driving direction of the first vehicle;

dynamically adjust the first message transmission rate to a second message transmission rate based on a comparison between the third and fourth operational data; and transmit, using the wireless transmitter, a fourth signal comprising a subsequent safety message at the determined second message transmission rate.

15. The logic according to claim 14, further operable to:

determine a first relative distance between the first vehicle and the second vehicle based on a comparison between the first operational data and the second operational data;

determine a first relative speed between the first vehicle and the second vehicle based on a comparison between the first operational data and the second operational data; and determine the first message transmission rate based on a statistical processing of the first operational data and at least one of the determined first relative distance and the determined first relative speed.

16. The logic according to claim 15, further operable to:

receive, from the second vehicle and using the wireless receiver, a third signal comprising third operational data describing motion of the second vehicle, wherein the third operational data comprises one or more of second speed data representative of a third speed of the second vehicle, second position data representative of a third position of the second vehicle, and second driving direction data representative a third driving direction of the second vehicle;

store, in the non-transient memory, fourth operational data describing motion of the first vehicle, the fourth operational data comprising one or more of a fourth speed, a fourth position, and a fourth driving direction of the first vehicle;

determine a second relative distance between the first vehicle and the second vehicle based on a comparison between the third operational data and the fourth operational data;

determine a second relative speed between the first vehicle and the second vehicle based on a comparison between the third operational data and the fourth operational data;

determine a second message transmission rate based on a statistical processing of the second operational data and one or more of the determined second relative distance and the determined second relative speed; and transmit, using the wireless transmitter, a fourth signal comprising a subsequent safety message at the determined second message transmission rate.

17. The logic according to claim 16, further operable to:

determine a first change in relative distance between the first vehicle and the second vehicle based on a comparison between the determined first and second relative distances;

determine a first change in relative speed between the first vehicle and the second vehicle based on a comparison between the determined first and second relative speeds; and determine the second message transmission rate based on a statistical processing of the determined first change in relative distance and the determined first change in relative speed.

18. The logic according to claim 17, wherein the statistical processing of the determined first change in relative distance and the determined first change in relative speed comprises one or more of a hypothesis testing processing or a sequential change detection processing.

* * * * *

UNITED STATES PATENT AND TRADEMARK OFFICE
CERTIFICATE OF CORRECTION

PATENT NO. : 9,532,194 B2
APPLICATION NO. : 14/273948
DATED : December 27, 2016
INVENTOR(S) : Tao Zhang et al.

Page 1 of 1

It is certified that error appears in the above-identified patent and that said Letters Patent is hereby corrected as shown below:

On the Title Page

Item (56), in Column 2, under "Foreign Patent Documents", Line 2, delete "WO" and insert -- EP --, therefor.

In the Specification

In Column 1, Line 67, after "implemented" insert -- . --.

Signed and Sealed this
Fourteenth Day of March, 2017

Michelle K. Lee
*Director of the United States Patent and Trademark Office*